US009189609B1

(12) United States Patent
Antony

(10) Patent No.: US 9,189,609 B1
(45) Date of Patent: Nov. 17, 2015

(54) SECURING VIRTUAL MACHINES WITH VIRTUAL VOLUMES

(71) Applicant: VMware, Inc., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 332 days.

(21) Appl. No.: 13/914,618

(22) Filed: Jun. 10, 2013

(51) Int. Cl.
*G06F 21/31* (2013.01)
*G06F 21/62* (2013.01)
*G06F 21/10* (2013.01)
*G06F 9/50* (2006.01)
*G06F 9/455* (2006.01)
*H04L 29/06* (2006.01)

(52) U.S. Cl.
CPC ............... *G06F 21/31* (2013.01); *G06F 21/10* (2013.01); *G06F 21/62* (2013.01); *H04L 63/08* (2013.01); *G06F 9/455* (2013.01); *G06F 9/5077* (2013.01); *G06F 2009/45587* (2013.01)

(58) Field of Classification Search
None
See application file for complete search history.

(56) References Cited

U.S. PATENT DOCUMENTS

2011/0061112 A1* 3/2011 Berengoltz et al. ............. 726/30
2013/0167228 A1* 6/2013 Wong .............................. 726/19

OTHER PUBLICATIONS

Unknown, "Comparison of Disk Encryption Software", accessed at <<http://en.wikipedia.org/w/index.php?title=Comparison_of_disk_encryption_software&oldid=544631910>>, Wlkipedia, accessed Apr. 9, 2013, 16 pages.
Unknown, "Trusted Platform Module", accessed at <<http://en.wikipedia.org/w/index.php?title=Trusted_Platform_Module&oldid=549139596>>, Wlkipedia, accessed Apr. 13, 2013, 5 pages.
Unknown, "Virtual Trusted Platform Module", accessed at <<http://researcher.watson.ibm.com/researcher/view_project.php?id=2850>>, IBM, accessed Apr. 9, 2013, 2 pages.
Unknown, "Dell Poweredge M710 Technical Guidebook: Inside the Poweredge M710", Dell, accessed at <<http://www.dell.com/downloads/global/products/pedge/en/server-poweredge-m710-tech-guidebook.pdf>>, Dell, accessed Apr. 9, 2013, 31 pages.
Unknown, "Netapp and VMware: vVols Tech Preview", accessed at <<http://datacenterdude.com/vmware/netapp-vmware-vvol/>>, Datacenter Dude, Oct. 5, 2012, 5 pages.

* cited by examiner

*Primary Examiner* — Qing Wu

(57) ABSTRACT

Embodiments provide virtual volumes to virtual machines based on configuration information to secure the virtual machines. Each virtual volume, without a file system, represents a portion of a storage array and is associated with at least one of the virtual machines. A host computing device attaches the virtual volume to the virtual machine based on the configuration information. Security software executing on the virtual machine accesses security information (e.g., encryption keys, etc.) stored in the virtual volume to provide security to the virtual machine (e.g., during bootup). In some embodiments, the virtual volume is attached and detached from the virtual machine as a universal serial bus (USB) device via an application programming interface to the storage array.

20 Claims, 10 Drawing Sheets

SECURING VIRTUAL MACHINES WITH VIRTUAL VOLUMES

BACKGROUND

Virtualization provides datacenters with highly efficient and available resource, networking, and storage management to reduce infrastructure costs such as capital, power, space, cooling, labor, and the like. In particular, virtual datacenters can have numerous host computers each executing thousands of virtual machines and guest operating systems. In such virtual datacenters or other shared storage systems, multiple host computers may share the same set of storage devices.

However, stealing a virtual machine by copying or modifying a file representing the virtual machine may be performed from anywhere on a network, or by using a flash drive. Further, the virtual machine has at least one data file (e.g., a virtual machine disk such as in the VMDK format) describing the virtual machine. This data file may be copied even when the virtual machine is not powered on, potentially resulting in data loss.

Some existing systems attempt to prevent unauthorized access to the physical host computers. For example, some of the existing systems use hardware-specific cryptographic coprocessors, or virtualized modules in a dedicated virtual machine. However, these existing systems fail to protect virtual machines, and their supporting data, hosted on the physical host computers. Further, in a virtualized environment a virtual machine may be migrated from one host to another host through operations such as vMotion from VMware, Inc. In this case, it is difficult to provide security for these virtual machines using hardware-specific cryptographic coprocessors. In particular, preventing access to the physical host computers does not secure, individually, the virtual machines hosted thereon. For example, using a virtualized module in a virtual machine dedicated to protecting the host computer does not protect the dedicated virtual machine. With the existing systems, virtual machine data may still be leaked even if the physical host computer hosting the virtual machine is protected using the existing systems.

SUMMARY

One or more embodiments described herein secure virtual machines (VMs) with virtual volumes. The virtual volume is defined from storage accessible to a host computing device, and associated with the host computing device and with the VM on the host computing device. The virtual volume is provided to a guest operating system of the VM for use by the VM as secure storage.

Alternatively or in addition, some embodiments contemplate the host computing device providing the virtual volume of storage to the VM based on configuration information. The configuration information defines access by the VM to the virtual volume. The virtual volume stores security information associated with the VM. Security software executing on the VM obtains the security information from the virtual volume for use in securing the VM. The host computing device removes the virtual volume from the VM based on the configuration information.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
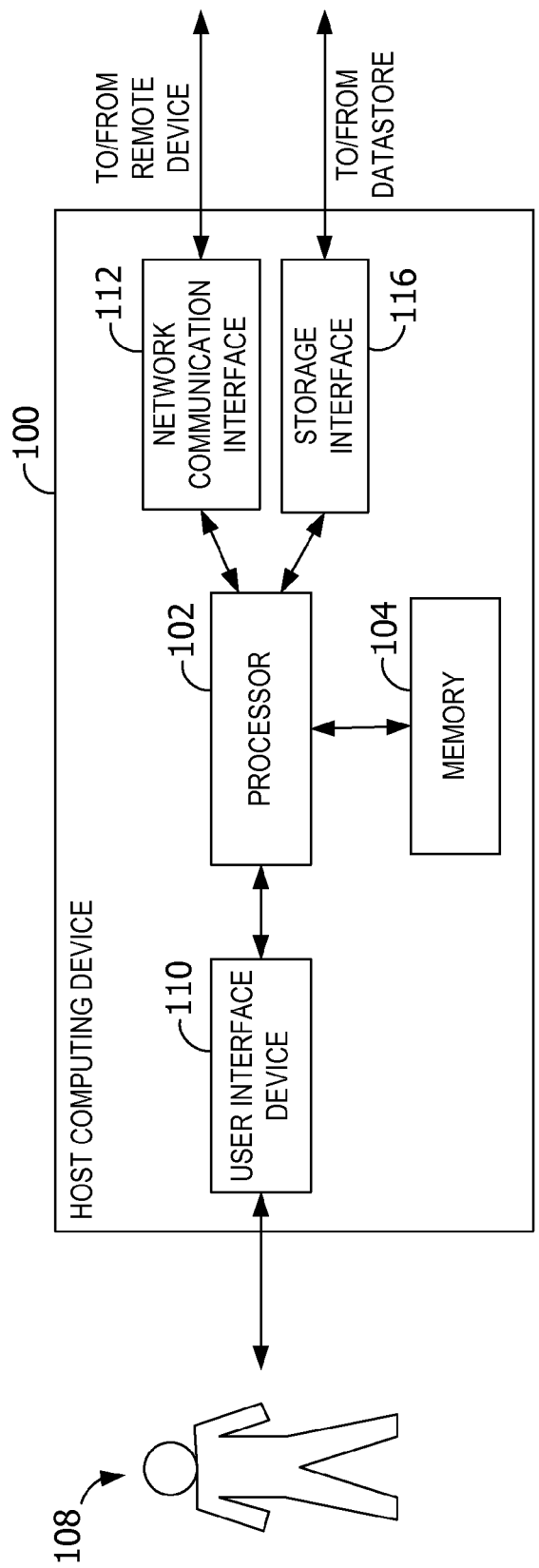
FIG. 1 is a block diagram of an exemplary host computing device.

Embodiments described herein provide an ecosystem for securing virtual machines (VMs) 235 in a virtualized environment in conjunction with security software 306 executing on VMs 235. A virtual volume 310 is created, virtualized as a mass storage device, and associated with one VM 235, in some embodiments. As an example, aspects of the disclosure are operable with any virtual volume 310, such as vVols provided by VMware, Inc. In general, virtual volumes 310 represent a portion of storage (e.g., storage 406) that is attached natively (e.g., without a file system) to VMs 235. Virtual volumes 310 may be created via any application programming interface (API) to storage arrays, such as by the VMware vStorage APIs for Storage Awareness (VASA) provided by VMware, Inc. Virtual volumes 310 are viewed by guest operating systems 265 executing on VMs 235 as, for example, a universal serial bus (USB) disk connected to a virtual USB controller of the VM 235.

Security software 306 executing on guest operating system 265 stores encryption keys, certificates, passwords, software licenses, or other security information 312 in virtual volume 310. Virtual volume 310 is attached and detached according to configuration information 308 to enable security software 306 to access security information 312 at particular times to secure VM 235 (e.g., prevent unauthorized access by entities to VM 235). For example, aspects of the disclosure provide security from a pre-boot environment until guest operating system 265 has booted by attaching virtual volume 310 during the pre-boot environment (e.g., to enable access by disk encryption software 502 which supports operating system disk encryption) and then detaching virtual volume 310 after guest operating system 265 has booted. In this manner, even if data describing VM 235 is stolen by an entity, VM 235 remains encrypted by security information 312 that is unavailable to the entity because security information 312 is stored separate from the data describing VM 235.

Aspects of the disclosure further achieve security with at least platform integrity, disk encryption, and password protection. Platform integrity is achieved by, for example, providing security for the data describing VM 235 (e.g., providing security for a VM disk file 402 corresponding to VM 235). Some embodiments provide platform integrity by preventing tampering with VMs 235. Further, disk encryption is achieved by enabling full disk encryption applications to use virtual volumes 310 to protect the keys used to encrypt the operating system and/or any disk and to provide secure booting of VM 235 and its guest operating system 265. Some embodiments further contemplate adding a user-defined password when attaching virtual volume 310 to VM 235.

FIG. 1 is a block diagram of an exemplary host computing device 100. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
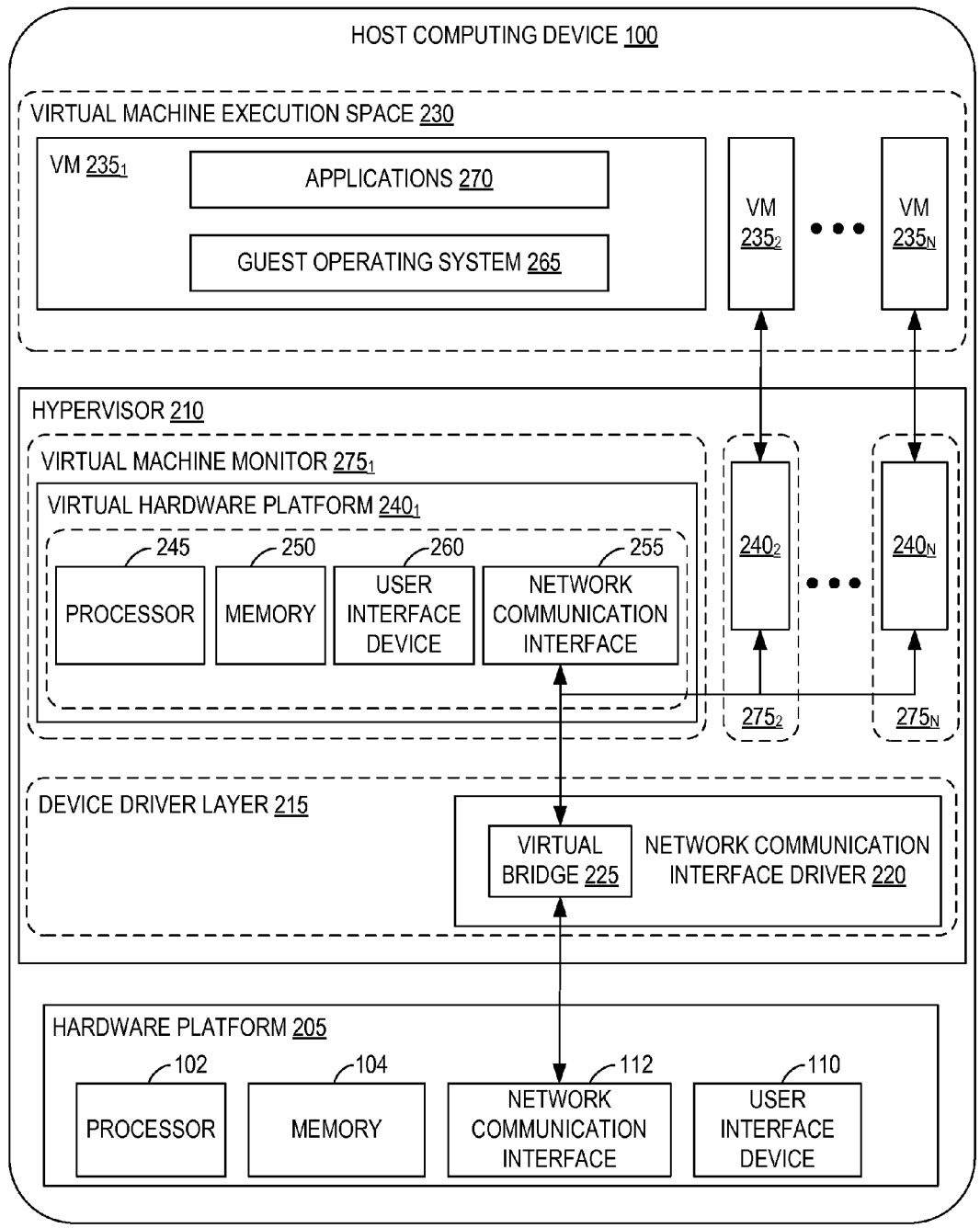
FIG. 2 is a block diagram of virtual machines that are instantiated on a computing device, such as the host computing device shown in FIG. 1.

FIG. 2 depicts a block diagram of VMs $235_1, 235_2 \ldots 235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (e.g., VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
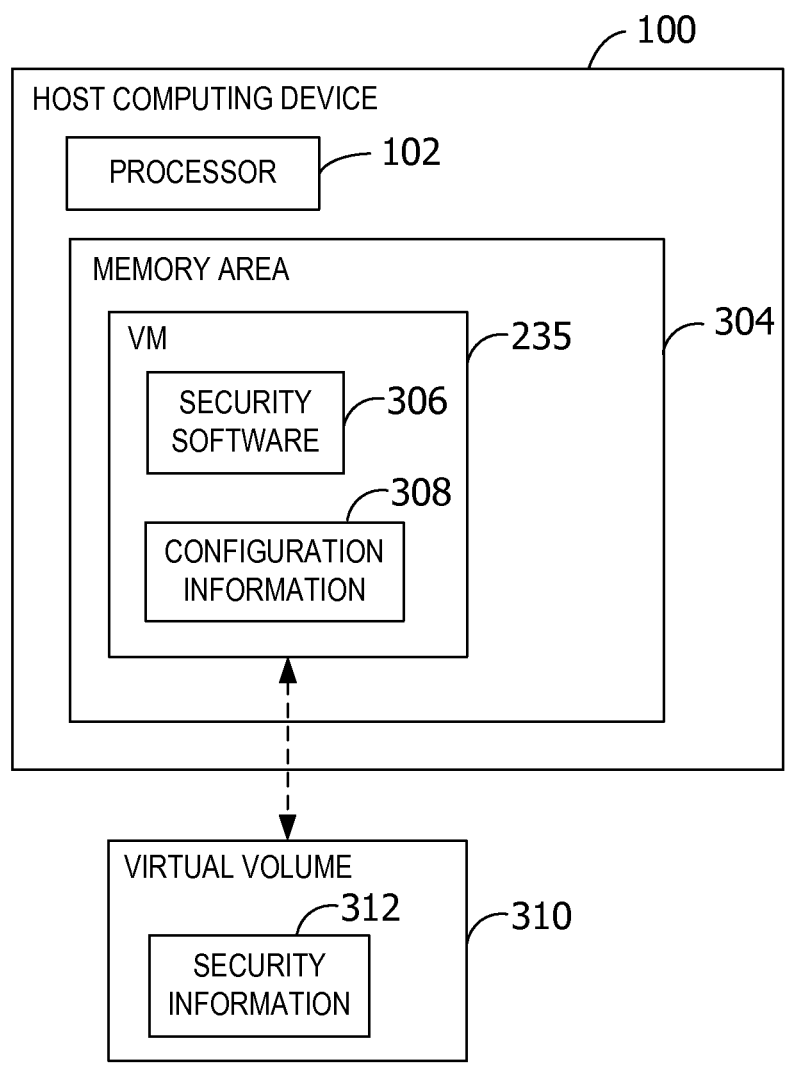
FIG. 3 is a block diagram of a host computing device having a virtual machine accessing a virtual volume based on configuration information.

FIG. 3 is a block diagram of host computing device 100 having VM 235 accessing virtual volume 310 based on configuration information 308. An administrator, or other user 108, interacts with host computing device 100 to secure one or more of VMs 235, such as described herein. Host computing device 100 represents any device executing instructions (e.g., as application programs, operating system functionality, or both). For example, host computing device 100 executes instructions to implement the operations illustrated and described with reference to the figures (e.g., FIG. 6, FIG. 7, FIG. 8, and/or FIG. 9). Host computing device 100 may include any computing device or processing unit. For example, host computing device 100 may represent a group of processing units or other computing devices, such as in a cloud computing configuration.

Host computing device 100 has at least one processor 102 and a memory area 304. Processor 102 includes any quantity of processing units, and is programmed to execute computer-executable instructions for implementing aspects of the disclosure. The instructions may be performed by processor 102 or by multiple processors executing within host computing device 100, or performed by a processor external to computing device. In some embodiments, processor 102 is programmed to execute instructions such as those illustrated in the figures (e.g., FIG. 6, FIG. 7, FIG. 8, and/or FIG. 9).

In some embodiments (not shown), host computing device 100 accesses hosts and datastores via a network. The network represents any means for communication with hosts and datastores. Aspects of the disclosure are operable with any network type or configuration.

Memory area 304 includes any quantity of computer-readable media associated with or accessible by host computing device 100. Memory area 304, or portions thereof, may be internal to host computing device 100 (memory 104), external to host computing device 100 (e.g., storage 406), or both.

In the example of FIG. 3, memory area 304 further stores one or more VMs 235 each having at least one guest operating system 265 executing thereon. In the example of FIG. 3, VM 235 stores security software 306. Security software 306 may be any of a plurality of security software products available to guest operating system 265 (e.g., stored in memory area 304) executed by VM 235. For example, security software 306 may include applications installed on VM 235 such as BITLOCKER brand computer software, Symantec Endpoint Encryption, TRUECRYPT brand computer software, and McAfee Endpoint Encryption. However, aspects of the disclosure are operable with any security software 306 that operates to prevent unauthorized access to VM 235 or portions thereof. For example, security software 306 includes any disk encryption software 502 that accesses an encryption key as a token.

Memory area 304 further stores configuration information 308 associated with at least VM 235 as shown in FIG. 3. Configuration information 308 defines access by VM 235 to virtual volume 310. For example, configuration information 308 describes when to attach and/or when to detach virtual volume 310 from VM 235 (e.g., from guest operating system 265). Aspects of the disclosure are operable with any form of configuration information 308, settings, conditions, and the like. In some embodiments, the type, content, and/or format of configuration information 308 differs based on the brand or version of security software 306 available to guest operating system 265.

Memory area 304 further stores a link or location of at least one virtual volume 310. Virtual volume 310 represents external storage 406 available to VM 235 (e.g., external to VM 235). As an example, virtual volume 310 may be provided as a partition of a storage array and/or as a raw disk (e.g., without a file system). Virtual volume 310 is provided and removed (e.g., attached and detached) from VM 235 based on configuration information 308. Virtual volume 310 is capable of storing any data. In some embodiments, virtual volume 310 stores security information 312 for use by security software 306.

Figure 4:
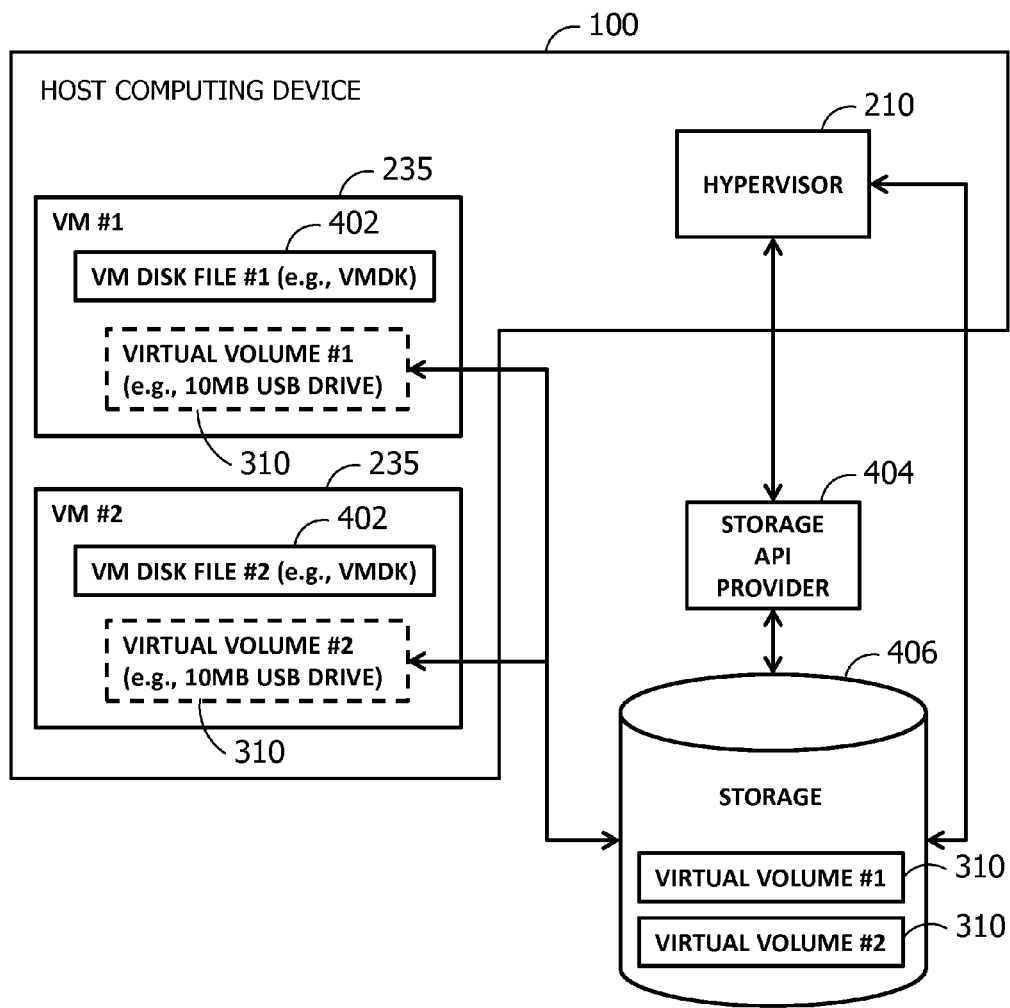
FIG. 4 is a block diagram of the relationship between virtual volumes and virtual machines executing on a host computing device.

FIG. 4 is a block diagram of the relationship between virtual volumes 310 and VMs 235 executing on host computing device 100. In the example of FIG. 4, host computing device 100 has two VMs 235 (VM #1 and VM #2), and hypervisor 210 or any other virtualization software layer. Each VM 235 has at least one VM disk file 402 (VM disk file #1 and VM disk file #2) describing VM 235. VM disk file 402 represents a virtual disk that has the complete disk of VM 235 thereon. Each of VM disk file #1 and VM disk file #2 may be in any format, such as the VM disk format (e.g., VMDK provided by VMware, Inc.). Each of VM #1 and VM #2 has one of virtual volumes 310 assigned thereto. For example, virtual volume #1 is assigned to VM #1, and virtual volume #2 is assigned to VM #2. Host computing device 100 additionally has access to storage 406, such as a disk array, storing virtual volume #1 and virtual volume #2 as raw disks without a file system. In another embodiment (not shown), virtual volume #1 and virtual volume #2 are stored on different storage arrays.

VM disk files 402 differ from virtual volumes 310 at least in that VM disk files 402 may be stored in storage 406 after creating a file system at the host computing device 100 level (e.g., VM file system such as VMFS provided by VMware, Inc.) accessible to multiple host computing devices 100 in a virtual datacenter. In contrast, while virtual volumes 310 may also be stored in storage 406, each virtual volume 310 is accessible only by VM 235 to which virtual volume 310 is assigned (e.g., confirmed through authentication). Further, VM disk files 402 are files, whereas virtual volumes 310 are partitions or other raw disks from the host computing device 100 without file systems written thereon, in some embodiments. The raw disk is attached as a USB disk to a virtual USB controller of VM 235. The guest operating system 265 or application inside VM 235 can use the raw disk with or without a file system on the disk. For example, the guest operating system 265 or application inside VM 235 may create any type of file system on the attached USB disk and store security keys or certificates on the attached USB disk.

In operation, hypervisor 210 communicates with storage 406 via a storage API provider 404 to provide and/or remove virtual volume #1 from VM #1, and virtual volume #2 from VM #2. For example, a VASA daemon executing on host computing device 100 interacts with storage 406 using a vendor-provided storage API to attach and/or detach virtual volume #1 and virtual volume #2 as USB drives. Aspects of the disclosure, however, are operable with any storage API provider 404 capable of describing the storage capabilities of one or more storage arrays, or otherwise interacting with the storage arrays. VASA, the VMware vStorage APIs for Storage Awareness provided by VMware, Inc., in particular is capable of interacting with multiple vendors of storage arrays. In some embodiments, a computing device or VM 235 executes to implement storage API provider 404.

In the example of FIG. 4, each of virtual volume #1 and virtual volume #2 are provided to VM #1 and VM #2, respectively, as 10 megabyte (MB) USB drives. Those skilled in the art will note, however, that virtual volume #1 and virtual volume #2 may represent any amount of memory (e.g., 5 megabytes, 100 megabytes, etc.). Further, the amount of virtual volume #1 and virtual volume #2 may be the same or different.

Figure 5:
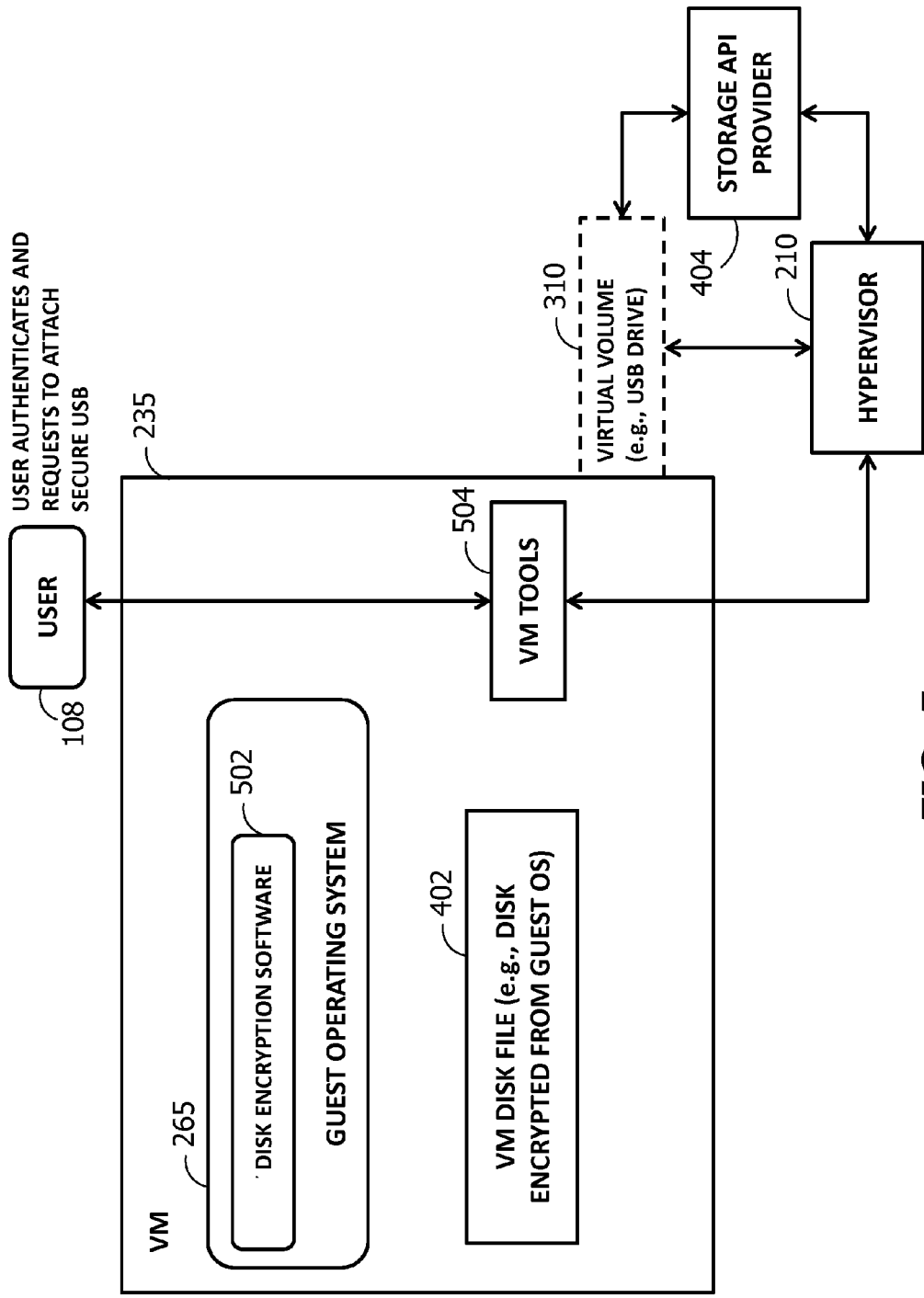
FIG. 5 is a block diagram of a virtual volume being attached to a virtual machine in response to a user request.

FIG. 5 is a block diagram of virtual volume 310 being attached to VM 235 in response to a request from user 108. In the example of FIG. 5, VM 235 has VM disk file 402 describing VM 235, VM tools 504, and guest operating system 265. VM tools 504 represent any set of drivers or utilities assisting with virtualization. For example, VM tools 504 may include routines for creating virtual volumes 310, deleting virtual volumes 310, and setting a size of virtual volumes 310. When deleting virtual volumes 310, host computing device 100 obtains and receives confirmation from guest operation system 265 before deleting any virtual volume 310. In this manner, host computing device 100 avoids deleting any virtual volume 310 that is used by another guest or application, thus preventing the guest operating system 265 from becoming unusable.

Guest operating system 265 has security software 306 installed thereon, such as any disk encryption software 502. Guest operating system 265 creates virtual volumes 310 and the VM disk files 402 are encrypted from guest operating system 265 by disk encryption software 502. For example, guest operating system 265 creates virtual volume #1, VM disk file #1 is encrypted, and the disk encryption keys are stored in virtual volume #1. Similarly, guest operating system 265 creates virtual volume #2, VM disk file #2 is encrypted, and the disk encryption keys are stored in virtual volume #2.

In operation, user 108 requests, through VM tools 504, attachment of virtual volume 310. In response, VM tools 504 communicates the user request to host computing device 100 (e.g., to hypervisor 210 associated with host computing device 100) to attach virtual volume 310. Hypervisor 210 communicates with the storage array, such as storage 406 from FIG. 4, via a storage API provider 404. For example, hypervisor 210 instructs storage API provider 404 to attach virtual volume 310 to VM 235 as a USB drive. In this example, virtual volume 310 is attached to a virtual USB controller of VM 235 using VASA based on user request. In other example, virtual volume 310 may be attached on startup of VM 235 or upon meeting any other condition(s), context, rules, or other settings described by configuration information 308.

Additional description of the creation and use of virtual volumes 310 is next described with reference to FIG. 6, FIG. 7, FIG. 8, and FIG. 9. While methods 600, 700, 800, 900 are described with reference to execution generally by host computing device 100, it is contemplated that any of methods 600, 700, 800, 900 may be performed by any component associated with host computing device 100 and/or any component associated with a computing device separate from host computing device 100. For example, methods 600, 700, 800, 900 may be performed by hypervisor 210, VM 235, guest operating system 265, applications executing on guest operating system 265, and/or other entities. Further, methods 600, 700, 800, 900 may be performed by computer-executable instructions stored on one or more computer-readable storage media. When executed by a processor such as processor 102, the instructions cause the processor to secure VMs 235 with virtual volumes 310.

Figure 6:
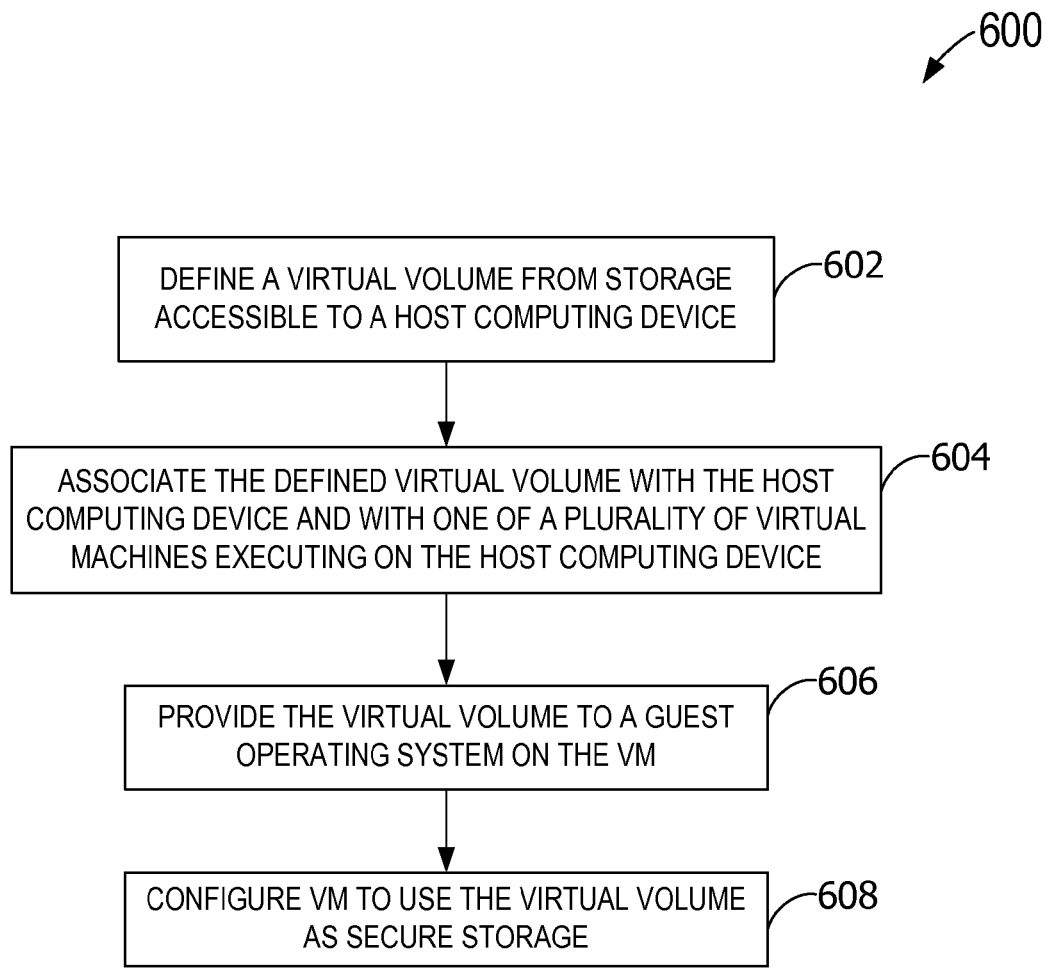
FIG. 6 is a flowchart of an exemplary method performed by a host computing device to create and assign a virtual volume to a virtual machine.

FIG. 6 is a flowchart of an exemplary method performed by host computing device 100 to create and assign virtual volume 310 to VM 235. At 602, host computing device 100 defines virtual volume 310 from storage 406 accessible to host computing device 100. In some embodiments, the virtual volume 310 represents a raw disk or partition, and does not have a file system written thereon. Virtual volume 310 maps to memory by, for example, mapping to a logical unit number (LUN) in a storage area network (SAN) or mapping to a file in a network file system (NFS). Each of virtual volumes 310 may be identified by an identifier unique among virtual volumes 310. For example, each virtual volume 310 may be tracked by a globally unique identifier (GUID). Defining virtual volume 310 includes, in some embodiments, invoking a routine via storage API provider 404 to create virtual volume 310 on a storage array. For example, virtual volume 310 is created using VASA.

At 604, virtual volume 310 is assigned to, or otherwise associated with, host computing device 100 and with one of a plurality of VMs 235 on host computing device 100. In such embodiments, virtual volume 310 is associated with only one VM 235 (e.g., to maintain security for VM 235). In other embodiments, however, virtual volume 310 is not specific to any particular VM 235, but instead may be used to store security information 312 associated with a plurality of VMs 235. The plurality of VMs 235 may be stored on the same host computing device 100 or on different host computing devices 100. At 606, host computing device 100 provides virtual volume 310 to guest operating system 265 executing on the assigned VM 235.

At 608, host computing device 100 configures VM 235 to use virtual volume 310 as secure storage. For example, host computing device 100 may define, and subsequently rely upon, configuration information 308 describing authorized access by the assigned VM 235 to virtual volume 310. Configuration information 308 describes, for example, when to attach and/or detach, as a partition, virtual volume 310 from the assigned VM 235. As an example, configuration information 308 defines attaching virtual volume 310 before booting guest operating system 265, and detaching virtual volume 310 after booting guest operating system 265, to secure VM 235. In another example, configuration information 308 defines attaching virtual volume 310 when a particular application is executed by VM 235. In still another example, configuration information 308 defines attaching virtual volume 310 storing a software license key only when a particular application is attempting to verify the software license key.

In some embodiments, host computing device 100 uses configuration information 308 to configure access to virtual volume 310 by security software 306 available to guest operating system 265. As an example, VM 235 stores, in virtual volume 310, hashed security information 312 for use by security software 306. Security software 306 accesses the hashed security information 312 from virtual volume 310 in accordance with configuration information 308. In some embodiments, security software 306 executes to define configuration information 308. For example, host computing device 100 provides virtual volume 310 to VM 235, and then user 108 interacts with security software 306 to define configuration information 308 for securing VM 235.

In embodiments in which a plurality of security software products is available to guest operating system 265, host computing device 100 may identify each of those security software products. For example, host computing device 100 may access a list of applications installed on guest operating system 265 and identify those application that may operate to secure VM 235 (e.g., based on an application type declared by each of the applications or by guest operating system 265). Further, one or more of the plurality of security software products may be automatically selected by host computing device 100 to use virtual volume 310 to secure VM 235. That is, in some embodiments, a plurality of security software products executing on VM 235 may access the same virtual volume 310 to secure VM 235. In other embodiments, a plurality of security software products executing on VM 235 may access different virtual volumes 310 assigned to VM 235. Host computing device 100 may automatically select one or more of the security software products based on, for example, criteria or preferences associated with user 108, applications executing on guest operating system 265, and/or guest operating system 265. For example, a mail application on guest operating system 265 may require a level of encryption provided only by a particular security software product. In this example, host computing device 100 identifies the security software product that provides the desired level of encryption.

Figure 7:
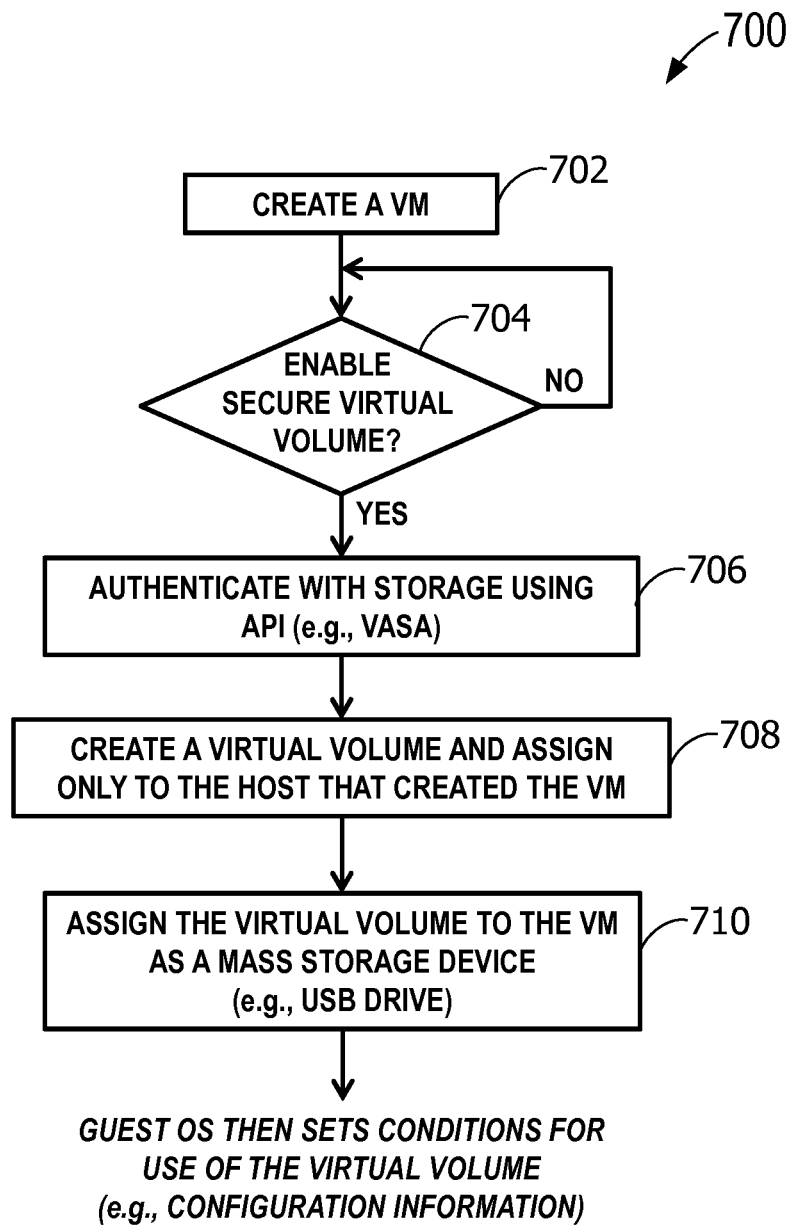
FIG. 7 is a flowchart of an exemplary method performed by a host computing device to secure a virtual machine with a virtual volume.

FIG. 7 is a flowchart of an exemplary method performed by host computing device 100 to secure VM 235 with virtual volume 310. VM 235 is created at 702. Host computing device 100 determines whether a secure virtual volume 310 should be enabled at 704. For example, VM 235, applications executing on VM 235, user 108, and/or guest operating system 265 on VM 235 may request or have requirements for accessing a secure virtual volume 310.

If a secure virtual volume 310 is desired, host computing device 100 authenticates with storage 406 at 706 using, for example, an API such as VASA. In some embodiments, host computing device 100 authenticates by presenting credentials uniquely associated with host computing device 100 relative to other devices. The credentials may include one or more identifiers associated with host computing device 100 such as a media access control (MAC) address, serial number, and/or hardware data. The credentials may take the form of a hash key.

Upon successful authentication, virtual volume 310 is created and assigned at 708 only to host computing device 100 that created VM 235. At 710, virtual volume 310 is assigned to VM 235 as, for example, a mass storage device. For example, host computing device 100 virtualizes virtual volume 310 as a USB disk. In the example of FIG. 7, guest operating system 265 executing on VM 235 sets conditions or otherwise configures use of virtual volume 310 by security software 306 to secure VM 235.

Figure 8:
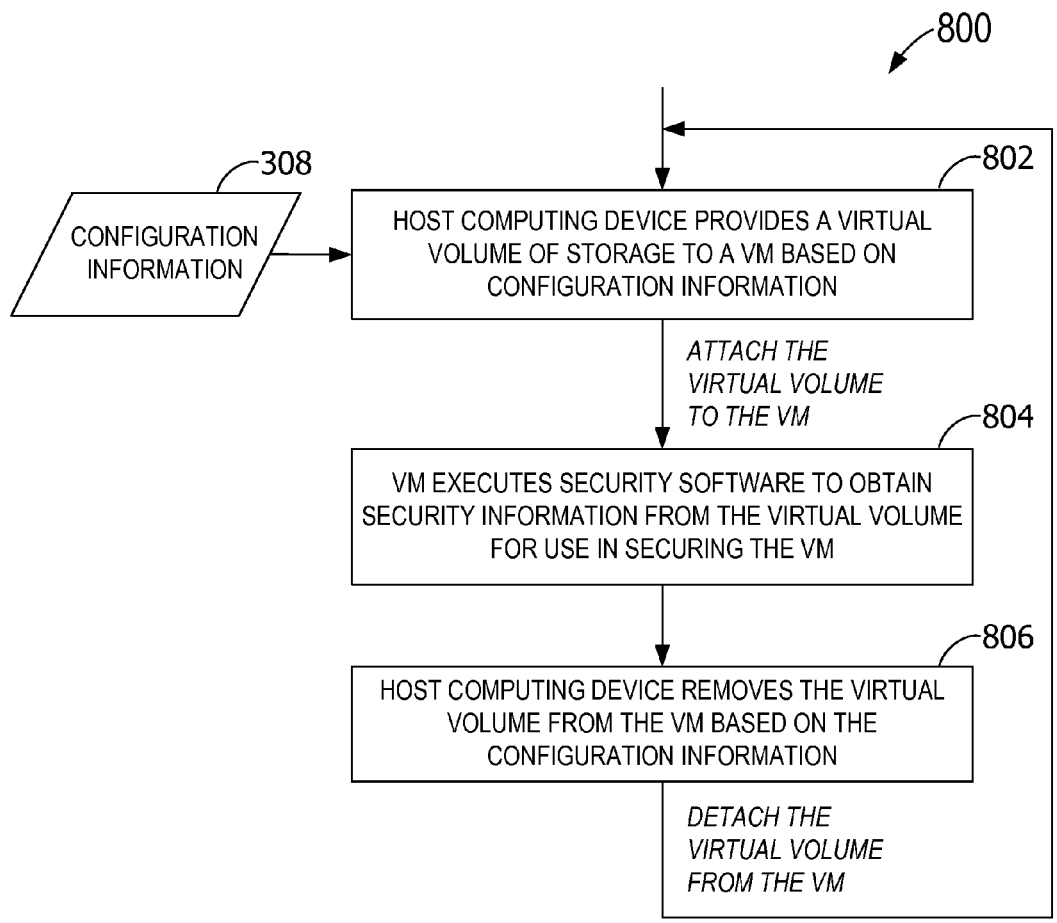
FIG. 8 is a flowchart of an exemplary method performed by a host computing device to attach and detach a virtual volume for use by security software to secure a virtual machine.

FIG. 8 is a flowchart of an exemplary method performed by host computing device 100 to attach and detach virtual volume 310 for use by security software 306 to secure VM 235. At 802, host computing device 100 provides virtual volume 310 to VM 235 based on configuration information 308. Virtual volumes 310 may be attached and detached from VM 235 using any logic available to guest operating system 265 (e.g., with password authentication). In some embodiments, virtual volumes 310 are hot-add and hot-plug supported. For example, host computing device 100 attaches virtual volume 310 to a virtual USB controller of VM 235 as a USB mass storage device, such as when powering on VM 235 or guest operating system 265 (e.g., during bootup). In another example, host computing device 100 receives a request from user 108 or guest operating system 265 to attach virtual volume 310 to VM 235. In some embodiments, host computing device 100 authenticates through storage API provider 404 when requesting access to virtual volume 310 from storage 406.

Virtual volume 310 stores, in this example, security information 312. At 804, VM 235 executes security software 306 to access security information 312 from virtual volume 310 for use in securing VM 235. At 806, host computing device 100 removes virtual volume 310 from VM 235 based on configuration information 308. For example, host computing device 100 detaches virtual volume 310 from VM 235 as a USB mass storage device, such as after bootup of VM 235 or guest operating system 265. In another example, host computing device 100 receives a request from user 108 or guest operating system 265 to detach virtual volume 310 from VM 235.

Figure 9:
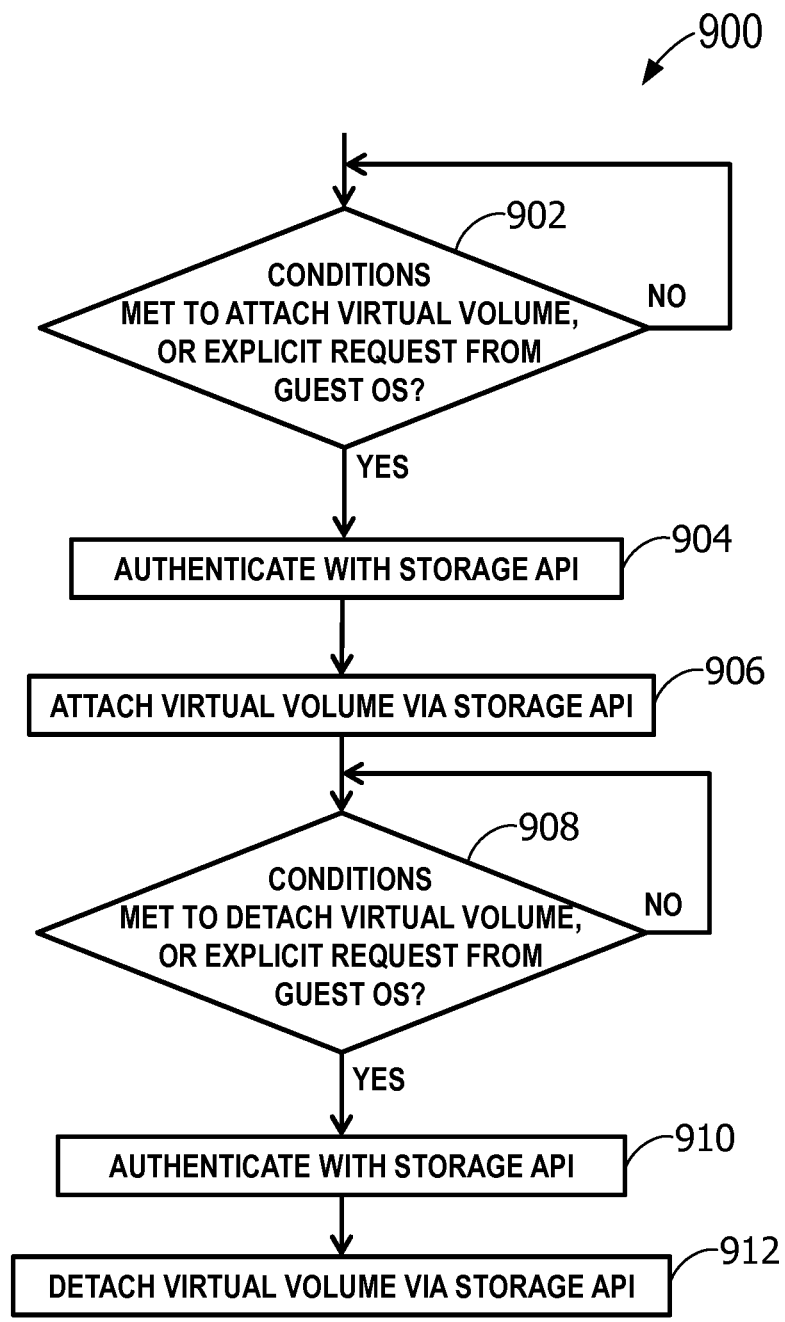
FIG. 9 is a flowchart of an exemplary method performed by a host computing device to attach and detach a virtual volume based on conditions or an explicit request from a guest operating system.

FIG. 9 is a flowchart of an exemplary method performed by host computing device 100 to attach and detach virtual volume 310 based on conditions, or an explicit request from guest operating system 265. At 902, host computing device 100 determines whether conditions have been met to attach virtual volume 310 to VM 235, or whether an explicit request has been received from guest operating system 265. For example, host computing device 100 accesses configuration information 308 to determine when to attach virtual volume 310. In such an example, configuration information 308 may store rules or parameters that host computing device 100 evaluates to determine whether a current context of VM 235 and/or guest operating system 265 satisfies the rules to prompt attachment of virtual volume 310.

Upon determining virtual volume 310 should be attached to VM 235, host computing device 100 authenticates with storage API provider 404 at 904. For example, host computing device 100 authenticates with VASA. Upon successful authentication, host computing device 100 attaches virtual volume 310 to VM 235 at 906.

At 908, host computing device 100 determines whether conditions have been met to detach virtual volume 310 from VM 235, or whether an explicit request has been received from guest operating system 265. For example, host computing device 100 accesses configuration information 308 to determine when to detach virtual volume 310. In such an example, configuration information 308 may store rules or parameters that host computing device 100 evaluates to determine whether a current context of VM 235 and/or guest operating system 265 satisfies the rules to prompt detachment of virtual volume 310.

Upon determining virtual volume 310 should be detached from VM 235, host computing device 100 authenticates with storage API provider 404 at 910. For example, host computing device 100 authenticates with VASA. Upon successful authentication, host computing device 100 detaches virtual volume 310 from VM 235 at 912.

Figure 10:
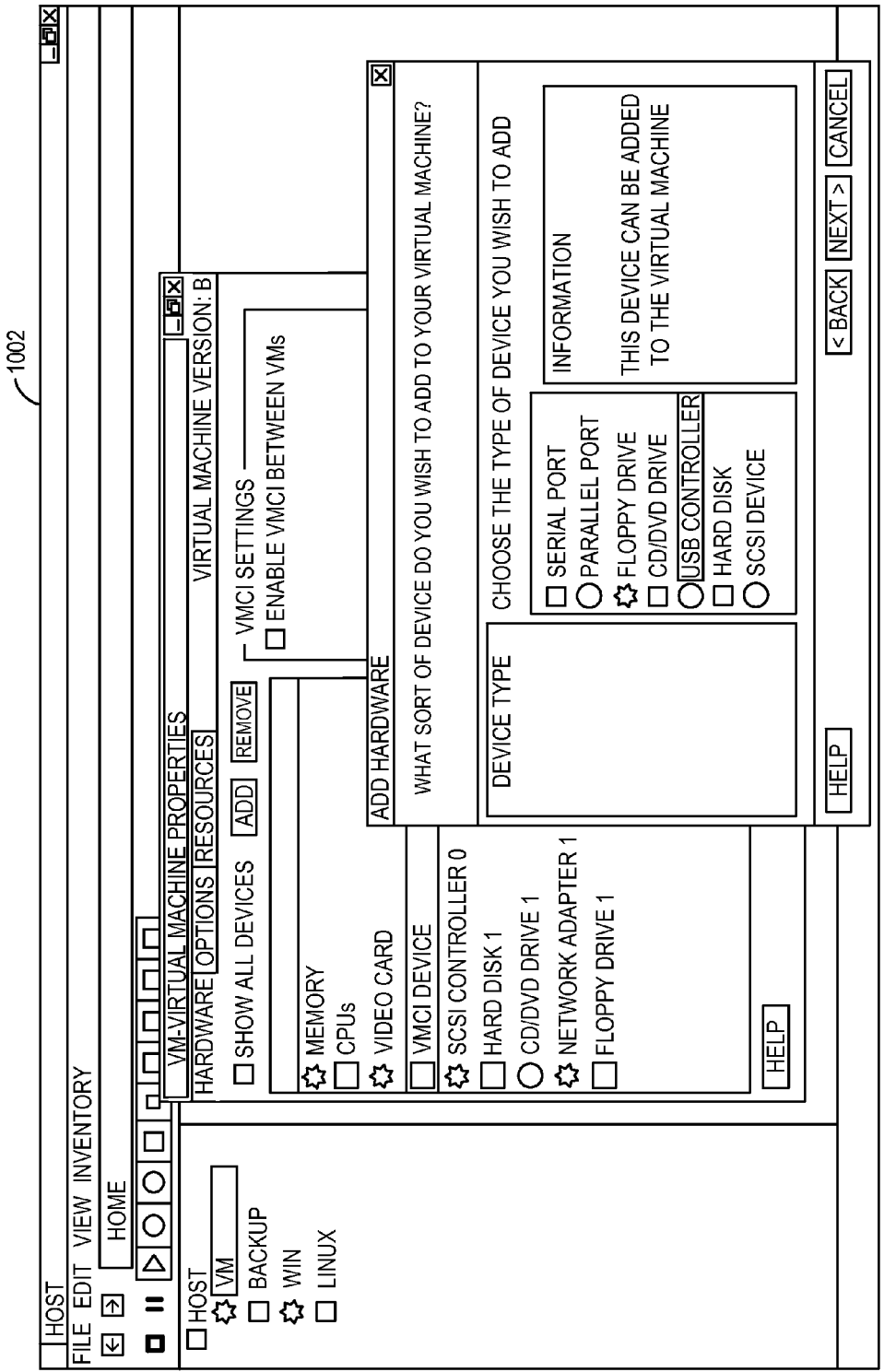
FIG. 10 is a screenshot of an exemplary user interface for adding a virtual volume to a virtual machine.

FIG. 10 is a screenshot of an exemplary user interface 1002 for adding virtual volume 310 to VM 235. In the example of FIG. 10, host computing device 100 has created VM 235. User 108 interacts with virtualization management software to add a secure virtual volume 310 to VM 235. In this example, user 108 selects VM 235 and then edits properties of VM 235. Properties include a list of hardware devices accessible to VM 235, as well as the option to add hardware devices. User 108 chooses to add a hardware device, and selects "USB controller" as the device type to add. User 108 continues to interact with host computing device 100 to set the USB drive to be virtual volume 310.

Additional Examples

The following scenarios are merely exemplary and not intended to be limiting in any way.

In one scenario, virtual volume 310 is stored in a storage array accessible by a plurality of host computing devices 100. Further, it may be desirable to migrate VM 235 from a first host computing device to a second host computing device. For example, an operation such as VMware, Inc.'s vMotion may be performed to migrate VM 235 from one host to another while VM 235 remains powered on. During such a migration, the first host computing device (e.g., source host) grants permission for the second host computing device (e.g., destination host) to access virtual volume 310 associated with VM 235. For example, first host computing device authenticates with storage API provider 404 that manages the storage array and identifies the second host computing device to storage API provider 404. After migration of VM 235 from the first host computing device to the second host computing device, the second host computing device revokes permission for the first host computing device to access virtual volume 310. For example, second host computing device authenticates with storage API provider 404 and identifies the first host computing device to storage API provider 404. In this manner, access to virtual volume 310 is preserved after migration of VM 235 from one host computing device 100 to another host computing device 100.

In some examples, configuration information 308 for a plurality of virtual volumes 310 on host computing device 100 is stored as a table. An exemplary table for storing such configuration information 308 is shown below in Table 1.

TABLE 1

Exemplary Table Storing Configuration Information for Virtual Volumes.

| Virtual Volume ID | Size | Array | Host | VM | Attach | Detach | OS Disk Encryption | Application List |
|---|---|---|---|---|---|---|---|---|
| 1 | 10 MB | S1 | H1 | VM1 | Preboot | Postboot | Yes | A1, A2 |
| 2 | 100 MB | S1 | H1 | VM2 | Postboot | OS Shutdown | No | NIL |
| 3 | 10 MB | S4 | H1 | VM3 | Preboot | Postboot | Yes | A1, A2, A3 |
| 4 | 10 MB | S2 | H2 | VM4 | A4 Application Start | A4 Application Exit | No | A4 |
| 5 | 10 MB | S3 | H3 | VM5 | A4 Application Start | A4 Application Exit | No | A4 |

In the example of Table 1, a 10 MB virtual volume 310 mapped to storage array S1 is attached to VM 1 preboot and detached postboot, a 100 MB virtual volume 310 also mapped to storage array S1 is attached to VM 2 preboot and detached upon OS shutdown (e.g., when VM 2 powers off), a 10 MB virtual volume 310 mapped to storage array S4 is attached to VM 3 preboot and detached postboot, a 10 MB virtual volume 310 mapped to storage array S2 is attached when application A4 executes and removed when application A4 terminates, and a 10 MB virtual volume 310 mapped to storage array S3 is attached when application A4 executes and removed when application A4 terminates.

Table 1 also identifies host computing device 100 hosting VMs 235, as well as whether OS disk encryption is enabled and which applications are authorized to access virtual volumes 310. However, those skilled in the art will appreciate that more or less information may be stored as configuration information 308 in Table 1.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

I claim:

1. A system for securing a virtual machine with a virtual volume, said system comprising:
   a memory area associated with a host computing device, said memory area storing a location of a virtual volume, security software, configuration information, and a plurality of virtual machines (VMs), the virtual volume storing security information associated with one of the plurality of VMs, the configuration information defining access by the one of the plurality of VMs to the virtual volume; and
   a processor programmed to:
      assign the virtual volume to the host computing device and to the one of the plurality of VMs;
      attach, based on the configuration information stored in the memory area, the assigned virtual volume to the one of the plurality of VMs for use as secure storage;
      execute the security software on the one of the plurality of VMs, the security software accessing the security information from the attached virtual volume; and
      detach, based on the configuration information, the attached virtual volume from the one of the plurality of VMs.

2. The system of claim 1, wherein the processor is further programmed to define the virtual volume in response to a request from a user interacting with the one of the plurality of VMs.

3. The system of claim 1, wherein the memory area further stores a guest operating system executing on the one of the plurality of VMs, and wherein the processor is further programmed to receive a request from the guest operating system to attach or to detach the virtual volume from the one of the plurality of VMs.

4. The system of claim 1, wherein the processor is further programmed to authenticate the one of the plurality of VMs before attaching the virtual volume to the one of the plurality of VMs.

5. The system of claim 1, wherein the processor is programmed to attach the assigned virtual volume to the one of the plurality of VMs as a universal serial bus (USB) drive.

6. The system of claim 1, wherein the processor is further programmed to execute the security software to define the configuration information.

7. A method comprising:
   providing, by a host computing device to one of plurality of virtual machines (VMs) based on configuration information, a virtual volume of storage, the configuration information defining access by the one of the plurality of VMs to the virtual volume, the virtual volume storing security information associated with the one of the plurality of VMs;

executing security software on the one of the plurality of VMs to obtain the security information from the virtual volume for use in securing the one of the plurality of VMs; and removing, by the host computing device, the virtual volume from the one of the plurality of VMs based on the configuration information.

8. The method of claim 7, wherein providing the virtual volume to the one of the plurality of VMs comprises attaching the virtual volume, without a file system thereon, to the one of the plurality of VMs as a universal serial bus (USB) mass storage device.

9. The method of claim 7, wherein providing the virtual volume to the one of the plurality of VMs based on the configuration information comprises attaching the virtual volume to the one of the plurality of VMs during bootup of a guest operating system on the one of the plurality of VMs.

10. The method of claim 7, further comprising authenticating the one of the plurality of VMs before providing the virtual volume to the one of the plurality of VMs.

11. The method of claim 7, wherein the virtual volume is stored in a storage array, and further comprising granting permission for another host computing device to access the virtual volume via an application programming interface (API) managing communication with the storage array.

12. The method of claim 11, further comprising migrating the one of the plurality of VMs from the host computing device to the another host computing device, the another host computing device revoking, via the API, permission for the host computing device to access the virtual volume after the migration.

13. One or more computer-readable storage media including computer-executable instructions that, when executed, cause at least one processor to secure a virtual machine with a virtual volume by:

defining a virtual volume from storage accessible to a host computing device, the virtual volume lacking a file system;

associating the defined virtual volume with the host computing device and with one of a plurality of virtual machines (VMs) on the host computing device; and providing the defined virtual volume to a guest operating system of the one of the plurality of VMs for use by the one of the plurality of VMs as secure storage.

14. The computer storage media of claim 13, wherein the computer-executable instructions further cause the processor to define configuration information describing access by the one of the plurality of VMs to the defined virtual volume.

15. The computer storage media of claim 14, wherein the computer-executable instructions cause the processor to define the configuration information by describing when to attach and/or detach the defined virtual volume, as a partition, from the one of the plurality of VMs.

16. The computer storage media of claim 14, wherein the computer-executable instructions further cause the processor to store security information in the defined virtual volume, the guest operating system accessing the stored security information from the defined virtual volume based on the defined configuration information.

17. The computer storage media of claim 14, wherein the computer-executable instructions define the configuration information by configuring security software to attach the defined virtual volume before booting the guest operating system and to detach the defined virtual volume after booting the guest operating system.

18. The computer storage media of claim 13, wherein the computer-executable instructions further cause the processor to configure access to the defined virtual volume by security software available to the guest operating system.

19. The computer storage media of claim 18, wherein the computer-executable instructions further cause the processor to create a file system on the defined virtual volume to store a security key associated with the security software.

20. The computer storage media of claim 13, wherein the computer-executable instructions further cause the processor to:

identify a plurality of security software products available to the guest operating system; and automatically select one of the plurality of security software products to use the defined virtual volume to secure the one of the plurality of VMs.

\* \* \* \* \*